Figure 1:
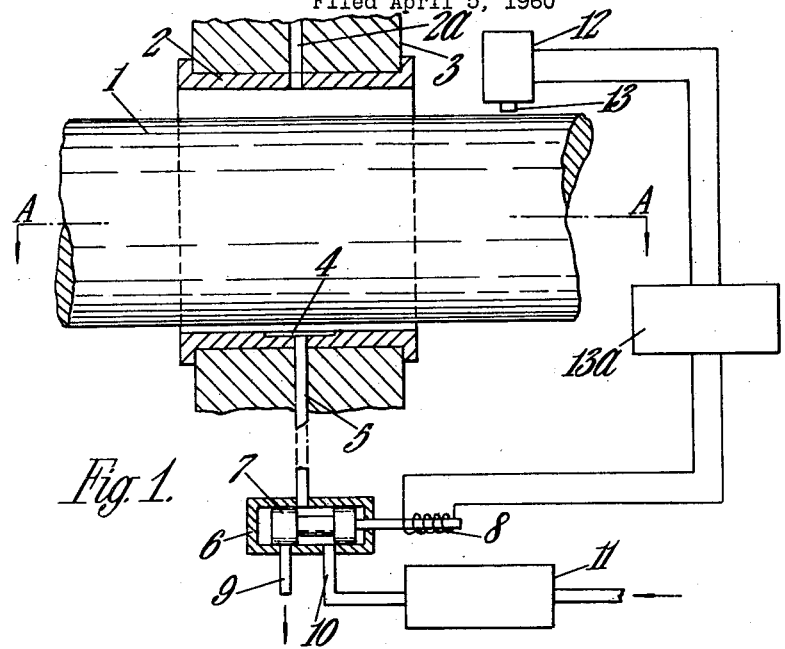

Sept. 11, 1962      A. CAMERON      3,053,589

JOURNAL BEARINGS

Filed April 5, 1960

INVENTOR

Alastair Cameron

BY

Larson and Taylor

United States Patent Office 3,053,589
Patented Sept. 11, 1962

3,053,589
JOURNAL BEARINGS
Alastair Cameron, London, England, assignor to National Research Development Corporation, London, England
Filed Apr. 5, 1960, Ser. No. 20,196
Claims priority, application Great Britain Apr. 7, 1959
12 Claims. (Cl. 308—122)

This invention relates to journal bearings for rotary shafts. The position of the shaft in an oil lubricated journal bearing depends upon various factors affecting the thickness of the oil film between the shaft and the bearing surface, among which are the shaft loading and speed of rotation, and the viscosity of the oil. Variation in one or more of these factors results in a change in the position of the shaft relative to the bearing surface which is extremely undesirable in certain machines, for example rolling mills, milling machines, or other machine tools such as jig borers. It is the main object of the present invention to provide an improved journal bearing in which such changes in the position of the shaft caused by changes in operating conditions are minimised or substantially eliminated.

According to the invention, a journal bearing is provided with means permitting or affording a controllable flow of oil to or from a loaded region of the bearing surface, and with means responsive to lateral changes in the position of the shaft for varying said oil flow in such a manner as to oppose such positional changes and thus maintain the shaft in a predetermined position.

The invention is intended to be applied to bearings running under mainly hydrodynamic conditions, i.e. where the surfaces are separated by an oil film the motion of which can be predicted from the equations of hydrodynamics, and the oil film is provided by the normal oil supply. In a convenient arrangement according to the invention, one or more passages opening into the loaded region of the bearing surface are arranged to communicate with atmosphere through one or more adjustable flow restricting means which are adjusted by one or more sensing mechanisms operative by movement of the shaft so as to increase or decrease the rate of oil flow from the bearing according to the direction of shaft displacement. The arrangement is such that if there is some oil bleed from the bearing under a given shaft load, then an increase in load causes a restriction of the bleed and increases the load carrying capacity of the bearing so that the thickness of the oil film will be restored to its original value. If the shaft load is reduced the converse takes place and thus the position of the shaft is maintained substantially constant under varying load conditions. If the flow restricting means are completely closed the openings in the bearing surface are such that the load carrying capacity of the bearing approaches that of a plain bearing of the same dimensions.

In one preferred mode of carrying the invention into effect, the bearing is constructed in such a manner that it can operate either under mainly hydrodynamic conditions with or without an additional hydrostatic component provided by an external pressure source. For this purpose the load carrying region of the bearing surface is provided with one or more bleed openings having adjustable flow restricting means operated by sensing mechanisms as previously described so that as the load on the bearing is increased the oil bleed is progressively reduced to zero. Means is also provided for connecting an external high pressure oil source through adjustable flow regulating means to the said bearing region, i.e. to the oil bleed opening or openings. Each flow regulating means is actuated by a sensing mechanism responsive to changes in the position of the shaft. The arrangement is such that if the increase in the shaft loading is such that closing of the oil bleed or bleeds is insufficient to maintain the shaft in its predetermined position, the flow regulating means is or are operated to force pressure oil to the bearing at a pressure higher than that which is generated by hydrodynamic action alone and thus to increase the load carrying capacity still further so as to maintain the shaft position. If the shaft load subsequently decreases, the above operations are reversed.

Figure 2:
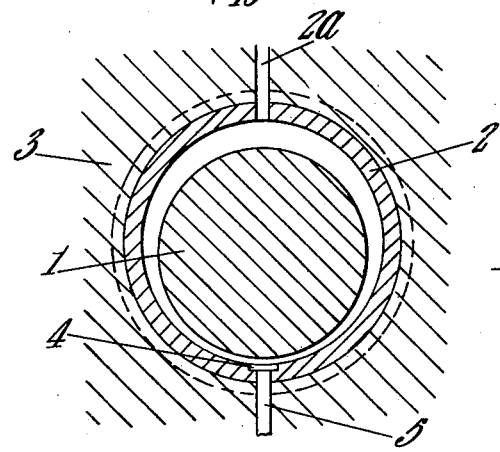
Figure 3:
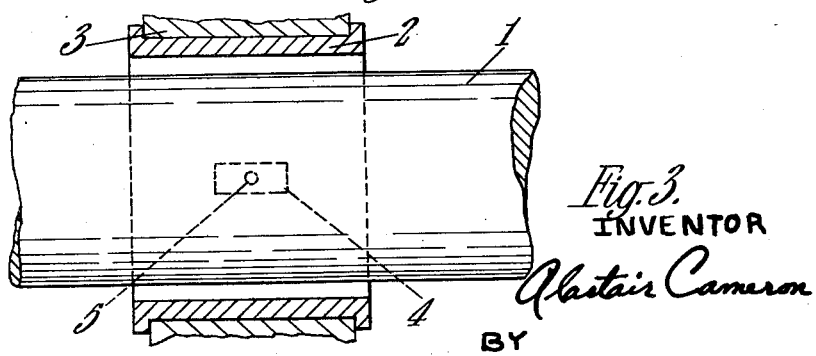

In the accompanying drawing,
FIGURE 1 is a longitudinal section of a journal bearing arranged and operating in accordance with one form of the invention;
FIGURE 2 is a cross section of the bearing of FIGURE 1;
FIGURE 3 is a sectional view on the line A—A of FIGURE 1.

In carrying the invention into effect according to one convenient mode as illustrated, a shaft 1 is journalled in a bearing sleeve 2 carried by a support 3. The clearance between the shaft and the bearing surface is shown as greatly exaggerated for the purpose of clarity. A normal oil supply is indicated at 2a. The lower part of the interior surface of the sleeve 2 is formed with a recess 4 having the shape of a rectangular slot parallel to the shaft and constituting a control chamber. This recess may be otherwise shaped if desired, e.g. it may be a transversely disposed slot. A passage 5 leads from the recess 4 to a valve casing 6 in which is slidable a double headed piston valve 7 actuated by a solenoid 8 or equivalent device. The valve 7 is arranged to control communication between the passage 5 and either an atmospheric or exhaust connection 9 or a passage 10 for supplying high pressure oil from a high pressure source 11. A sensing head 12 has a suitable sensing member 13 engageable by the shaft 1 and arranged to transmit appropriate electrical impulses to an amplifier or servo device 13a to actuate the valve 7 in one or other direction by means of the solenoid or other electromagnetic device 8 and thus to adjust the flow restricting and high pressure supply control means represented by the valve 7. The arrangement is such that the bearing can operate either under mainly hydrodynamic conditions (with a low pressure oil supply from 2a) with or without an additional hydrostatic component provided by the external pressure source 11. With this arrangement the bearing may be considered as operating when relatively lightly loaded under hydrodynamic conditions with a suitable oil bleed from the passage 5 controlled by the position of the valve 7. If the shaft loading increases to such an extent that the oil film is insufficient to maintain the shaft in a predetermined position, the consequent displacement of the shaft actuates the sensing head 12 and thence the electromagnetic device 8 to displace the valve 7 to the right as seen in FIGURE 1 so that the oil bleed is progressively closed and the shaft is returned to its original predetermined position. If the shaft loading should further increase and the shaft is again displaced, the sensing head 12 is actuated to cause through the amplifier 13a and the electromagnetic device 8 a further movement of the valve 7 to the right so as to open the high pressure supply passage 10 and to force pressure oil into the bearing through the passage 5 at a pressure higher than that which is generated by the hydrodynamic pressure alone. The load carrying capacity of the bearing is thus increased still further so that the shaft is returned to its predetermined position. If the shaft loading should subsequently decrease, the above operations are reversed, so that a desired position of the shaft is always maintained.

It is to be understood that whilst in the above example only one control chamber 4 is shown, it may be preferred to provide two or more such chambers, and each may have a control valve and sensing head.

In applying the invention to a shaft bearing where the shaft is required to start up with the bearing loaded, the arrangement of the above described example is modified in respect to the operation of the control valve 7 so that the bearing runs as a hydrostatic bearing during starting, i.e. the bearing surface is supplied with oil under a suitable pressure from the external source 11. In this condition the valve 7 will occupy a position towards the right hand side of its casing to open the supply passage 10 to the passage 5, the sensing head 12 controlling the opening of passage 10 to maintain a predetermined position of the shaft. As the shaft gains speed and the hydrodynamic pressure within the bearing sleeve increases sufficiently to take the load, the consequent shaft displacement actuates the sensing head so that the valve 7 is moved to the left to cut off the high pressure supply through the passage 10 progressively to zero, and subsequently the valve is moved further to the left, if this should be necessary, to open the exhaust 9 and thereby allow a normal bleed to atmosphere. This is all controlled by the position of the shaft as determined by the sensing head 12. The arrangement is preferably such that the pressure of the initial supply of oil from the source 11 for hydrostatic running is progressively reduced to zero as the desired hydrodynamic condition is reached, the bearing then running normally with a suitable oil bleed. It will be understood that when the shaft is stationary it will rest on the bottom of the sleeve 2, and on switching on the sensing means the valve will be moved to the right and thus provide a supply of high pressure oil to support the shaft. If the shaft operating conditions are such that full speed is reached in a short time, the high pressure oil needed initially over this period may be obtained from a hydraulic accumulator which can be supplied as required from a small high pressure pump.

In carrying the invention into effect according to another mode, the arrangement illustrated in FIGURES 1, 2 and 3 is modified by omitting the high pressure source 11 and the passage 10, and arranging the valve 7 to control the exhaust 9 only. A predetermined position of the shaft is then maintained by varying the oil bleed between zero and a maximum possible bleed as determined by displacement of the shaft acting on the sensing head.

One method, which may be preferred, of operating a bearing according to the invention as illustrated is to provide for normal running under hydrodynamic conditions with the oil bleed closed. Compensation for a reduction in the bearing load is then obtained by opening the oil bleed to the required extent, and compensation for an increase in load above the normal is effected by supplying high pressure oil to provide an extra load component as previously described.

In applying the invention to the roll of a rolling mill, the sensing head or heads is or are operated by radial displacement of the roll or the roll neck away from the predetermined position. Alternatively the control may be made dependent upon the thickness of the strip or other product being rolled as determined by a thickness gauge of any suitable type. It will be understood that in the case of the upper roll the load will be upwards and the bearing will be inverted as compared with FIGURE 1. In these circumstances additional oil is supplied to the lower part of the bearing to take the gravity load of the roll or the bearing is provided with two or more devices according to the invention spaced around its circumference. In applying the invention to machine tools such as milling machines or jig borers, the sensing head is actuated by the position of a cutting tool the shaft of which is supported by a bearing or bearings according to the invention. With this arrangement there is provided compensation not only for changes in oil film thickness in the bearing, but also for elastic deformation of the machine structure.

It will be understood that the number and position of the bleed or pressure supply openings in a bearing according to the invention will be determined by the operating conditions. In a simple example a single opening positioned near the bearing load line would afford at least a measure of control, but it will generally be desirable to provide two or more such openings each having suitable flow control means as previously described. These control means may be operated either singly or together by one or more sensing heads as desired. The sensing heads may be of any suitable known kind such for example as employed in connection with machine tools and including suitable relay arrangements for operating the flow regulating means. The flow control or regulating means may be of any desired kind, for example restricted orifices which are adjustable to vary the rate of flow. The sensing head which may be a proximity meter or a continuously reading gauge thickness micrometer.

It will be understood that the invention may be applied to any journal bearing where it is desired to maintain the position of the shaft within close limits under varying conditions of operation.

I claim:

1. A rotary shaft bearing of the hydrodynamic type for supporting a shaft therein, comprising a bearing surface, an oil film on said surface, means for supplying a relatively low-pressure oil film to the bearing surface, oil outlet means leading from a loaded region of the bearing surface, an external relatively high-pressure oil source in communication with said loaded region and adapted to supply a hydrostatic load-bearing component to the oil film greater than the hydrodynamic component, and means responsive to lateral positional changes of the shaft in the bearing for controlling oil flow from the outlet means and an oil supply from the high-pressure source to maintain the shaft substantially in a predetermined position.

2. A bearing according to claim 1, in which the oil outlet means comprises a passage opening to atmosphere and having adjustable flow restricting means therein, and in which the oil supply from the high pressure source comprises a passage having adjustable flow restricting means therein, further comprising sensing means responsive to lateral positional shaft changes and means controlled by said sensing means to actuate the aforesaid adjustable flow restricting means to increase or decrease the pressure of the oil film at the loaded region of the bearing so as to maintain the position of the shaft.

3. A bearing according to claim 1, in which the means for controlling the oil outlet means and the high pressure oil supply means comprises valve means having a port for the oil outlet means, means for variably closing said port in response to corresponding increases in said lateral positional changes; and having a further port for the said supply means, means for variably opening said further port in response to further corresponding increases, means for admitting oil to supply the hydrostatic load bearing component from said supply means at a pressure higher than said hydrodynamic component.

4. A bearing according to claim 1 and further comprising a control chamber constituted by a recess in the bearing surface located in a load bearing region thereof, and in which the said oil outlet means and the oil supply from the said high-pressure source open into said control chamber.

5. A bearing according to claim 1 and further comprising a sensing head actuated by changes in the lateral position of the shaft, and servo means controlled by said sensing head for actuating the said flow controlling means.

6. A rotary shaft bearing of the hydrodynamic type for supporting a shaft therein, comprising a bearing surface, an oil film on said surface, means for supplying a relatively low-pressure oil film to the bearing surface, oil outlet means leading from a loaded region of the bearing surface, an external relatively high-pressure oil source and means for supplying high pressure oil therefrom to said loaded region to afford a hydrostatic load-bearing component to the oil film greater than the hydrodynamic component, means for regulating oil flow from the oil outlet means and oil supply from the high pressure source, and sensing means responsive to lateral changes in the position of the shaft for actuating said regulating means to provide an oil pressure at said loaded region to oppose positional changes of the shaft.

7. A bearing according to claim 6 in which the oil flow regulating means comprises valve means having a port for the oil outlet means, means for variably closing said port for corresponding increases in said positional changes; and having a further port for said oil supply, means for variably opening said further port for further corresponding increases in said positional changes.

8. A bearing according to claim 6, and further comprising two-way valve means for regulating oil flow from the oil outlet means and from the high-pressure oil source respectively.

9. A bearing according to claim 6 and further comprising valve means for regulating the oil flow, said valve means being constructed and arranged so that operation of the sensing means consequent on changes in the lateral position of the shaft progressively closes the oil outlet means and progressively opens the supply of high pressure oil.

10. A bearing according to claim 6, in which the oil flow regulating means comprises a double headed piston valve arranged and operable to control the oil outlet means and the high pressure oil supply.

11. A bearing according to claim 6 arranged for starting up under load, in which the oil flow regulating means is arranged to supply high pressure oil when starting to operate the bearing as a hydrostatic bearing, and to cut off said high pressure oil supply progressively as the shaft gains speed and the hydrodynamic pressure thereby created in the oil film increases sufficiently to take the bearing load.

12. A bearing according to claim 6, including means for actuating the oil flow regulating means to supply high pressure oil to the bearing during starting to provide a hydrostatic load bearing component and to cut off said high pressure oil supply progressively as the shaft gains speed and the hydrodynamic pressure thereby created in the oil film increases sufficiently to take the load, said regulating means being also arranged to adjust the oil outlet means to maintain the shaft position after the high pressure supply has been cut off.

References Cited in the file of this patent

UNITED STATES PATENTS 2,692,803     Gerard _____ Oct. 26, 1954

FOREIGN PATENTS 851,429     Germany _____ Oct. 6, 1952